(12) United States Patent
Whitney

(10) Patent No.: US 6,308,375 B1
(45) Date of Patent: Oct. 30, 2001

(54) ORGANIC DEBRIS COLLECTION DEVICE WITH CURVED BLOWER CONDUIT

(75) Inventor: James C. Whitney, Norwalk, CT (US)

(73) Assignee: Woodland Power Products, West Haven, CT (US)

( * ) Notice: Subject to any disclaimer, the term of this patent is extended or adjusted under 35 U.S.C. 154(b) by 0 days.

(21) Appl. No.: 09/531,614

(22) Filed: Mar. 21, 2000

(51) Int. Cl.$^7$ .................................................. A01D 34/12
(52) U.S. Cl. ........................... 15/347; 15/405; 15/340.1; 406/173
(58) Field of Search ......................... 15/347, 405, 340.1; 406/41, 83, 93, 171, 173, 181, 191

(56) References Cited

U.S. PATENT DOCUMENTS

| | | | |
|---|---|---|---|
| 608,990 | 8/1898 | McCutcheon | 406/155 |
| 1,818,367 | 8/1931 | Wallace | 406/154 |
| 1,821,857 | 9/1931 | Stoetzel | 406/93 |
| 3,924,899 | 12/1975 | Salete | 406/94 |
| 4,773,205 | 9/1988 | Hansen et al. | 56/13.3 |
| 4,821,495 | 4/1989 | DeBuhr et al. | 56/13.3 |
| 5,265,984 | 11/1993 | Nakagawa | 406/155 |
| 6,003,195 | * 12/1999 | Whitney | 15/314 |
| 6,029,312 | * 2/2000 | Whitney | 15/347 |
| 6,076,231 | * 6/2000 | Bucher | 15/405 |

* cited by examiner

Primary Examiner—Robert J. Warden, Sr.
Assistant Examiner—Theresa T. Snider
(74) Attorney, Agent, or Firm—Ware Fressola Van Der Sluys & Adolphson LL

(57) ABSTRACT

A curved blower exhaust conduit, delivering an air stream carrying pulverized or granulated entrained solids to a substantially sealed cargo chamber enclosure of fixed volume, is provided with a pressure relief vent mounted at an "inner" peripheral region of the curved conduit having a smaller radius of curvature than the outer peripheral region of the conduit, thereby connecting the interior of the curved conduit to the external atmosphere at a point where the majority of entrained solids are carried adjacent to the outer peripheral region by the air stream.

13 Claims, 3 Drawing Sheets

ORGANIC DEBRIS COLLECTION DEVICE WITH CURVED BLOWER CONDUIT

This invention relates to vents formed at the minimum inner radius of curvature of a curved blower exhaust conduit through which entrained solid particles are carried by an advancing stream of air, and more particularly to such vents formed in a blower conduit carrying organic debris, leaves, twigs, grass clippings and the like from a blower fan to a debris collector enclosure or bag, minimizing internal pressure in the collector and expediting the deposit of debris in the collector enclosure.

These vents are improvements on the blower exhaust conduits illustrated and described in my U.S. Pat. Nos. 6,029,312, issued Feb. 29, 2000, and 6,003,195 issued Dec. 21, 1999.

BACKGROUND OF THE INVENTION

The collection of leaves, grass clippings and other organic debris from lawn mowers into either fabric collector bags, or into rigid containers of metal or plastic, is well known.

However, in order to keep the air stream, and its attendant debris moving, means must be provided for venting the high-velocity air. In vacuum cleaners and lawnmowers which employ collector bags, this is commonly done by using a bag of porous weave which permits the air to perfuse through the fabric. However, as the bag fills up, the pores become clogged with debris which substantially blocks the air flow and greatly reduces the vacuum effect, sometimes reducing it to near zero. In addition, when such fabric bags become clogged, they are subjected to high internal pressure from the blower air stream. If the blower is very powerful, the bag can rip apart at the seams.

If the weave of the bag is made larger to avoid clogging, a great quantity of material is lost through the mesh, and the equipment operator may be exposed to quantities of choking dust and debris particles. Furthermore, the higher air pressure inside the bag tends to "plaster" the leaves, grass and other debris against the inside of the mesh, effectively blocking the air flow and reducing the vacuum effect.

In yet other types of lawn vacuum equipment, the collector container is made of rigid metal or plastic, or solid weave fabric which does not breathe at all thereby forming a substantially sealed chamber. In all such cases, either a clear opening or an open-mesh screen must be provided to vent the air, in order to provide the vacuum effect. These arrangements have just the same problems as described above. Either a great quantity of material is lost through the vent area, or the vent mesh itself clogs from the higher inside air pressure, which forces the debris against the vent screen, thus reducing or eliminating the vacuum effect.

BRIEF SUMMARY OF THE INVENTION

It has now been discovered that one or more vents diverting a portion of the blower exhaust stream downward or sidewise, transverse to its direction of travel through an upwardly arched curved sector of the blower delivery conduit, will almost completely eliminate the problems described above. With this arrangement it is possible to completely fill a collector container of any type, whether solid metal, rigid plastic, or closed mesh fabric, even when the container has no venting means or vent screen at all. Nearly full vacuum effect is maintained all the way to the top of the collector container, with virtually no escape of debris. In addition, the high internal pressure which can develop inside a vent-clogged collector bag or container is substantially reduced. The effect is quite startling when observed in actual operation.

In organic material collection systems, the relief vents are preferably formed in the curved delivery conduit's lower wall near the smallest radius of curvature on the "inside" of the curve. Since the curved delivery conduit is often convexly arched upward, a vent facing directly downward would cause a downdraft like a helicopter's downwash, scattering organic debris on the ground below the blower and trailer which ideally should remain in place until it is drawn in by the blower and delivered to the collector bag. The vents shown in the drawings divert and eject air sidewise, away from the vicinity of the blower, the operator and the collector bag, reducing to a minimum the scattering of debris.

The entrained organic particles in the air stream are believed to be carried by the "outside" maximum radius region of the curved sector of the delivery conduit, and venting the "inside" minimum radius region of the curved sector releases very few entrained particles or bits of debris.

Accordingly, a principal object of the invention is to maximize the effectiveness of blower-driven air streams carrying entrained organic debris into a collector enclosure by eliminating the need for venting the air flow from inside the collector container, and thereby eliminating the problems of debris escape, vent mesh clogging, and the loss of vacuum effect described above.

Another object is to reduce the pressure developed inside the collector container which results when the air escape path is completely blocked. This is particularly important in fabric collector bags, which can be over stressed or even torn apart by blower pressure if the vents become clogged.

Still another object is to form vents in the delivery conduit, ejecting air from a curved region of the conduit while minimizing ejection of entrained particles therefrom.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

THE DRAWINGS

For a fuller understanding of the nature and objects of the invention, reference should be made to the following detailed description taken in connection with the accompanying drawings, in which.

BEST MODE FOR CARRYING OUT THE INVENTION

Figure 1:
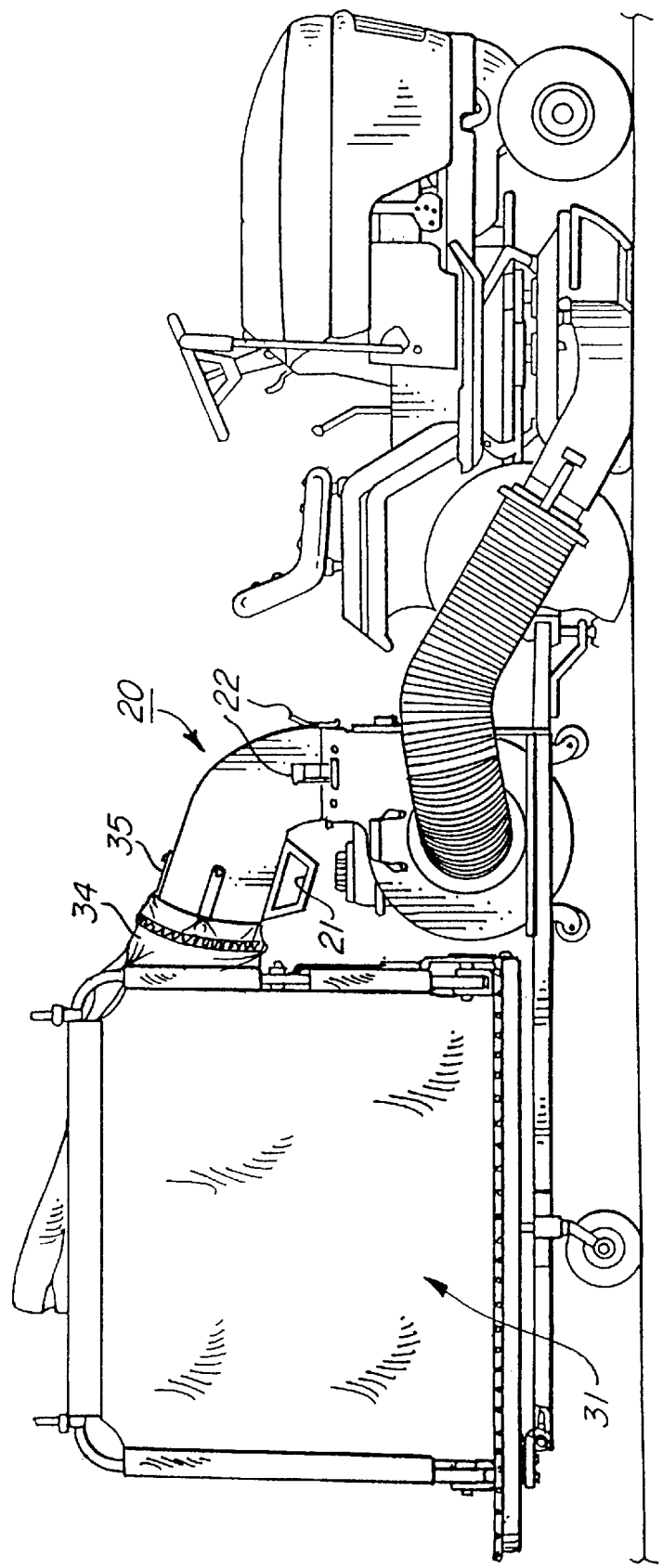
FIG. 1 is a side elevation view of a lawn mowing tractor towing a trailer which carries a blower having an exhaust conduit delivering organic debris to a fabric collector bag also carried on the trailer.

Blower exhaust conduits 20 incorporating two back-pressure diverting relief vents 21 are shown in the FIGURES. Each exhaust conduit 20 may have any desired cross-sectional shape. The conduits shown in FIGS. 1 through 6 have a square cross-section at their lower intake ends, carrying latches 22 which removably attach each conduit in its operative position, overlying the upward facing exhaust portal 23 of blower 24.

Figure 2:
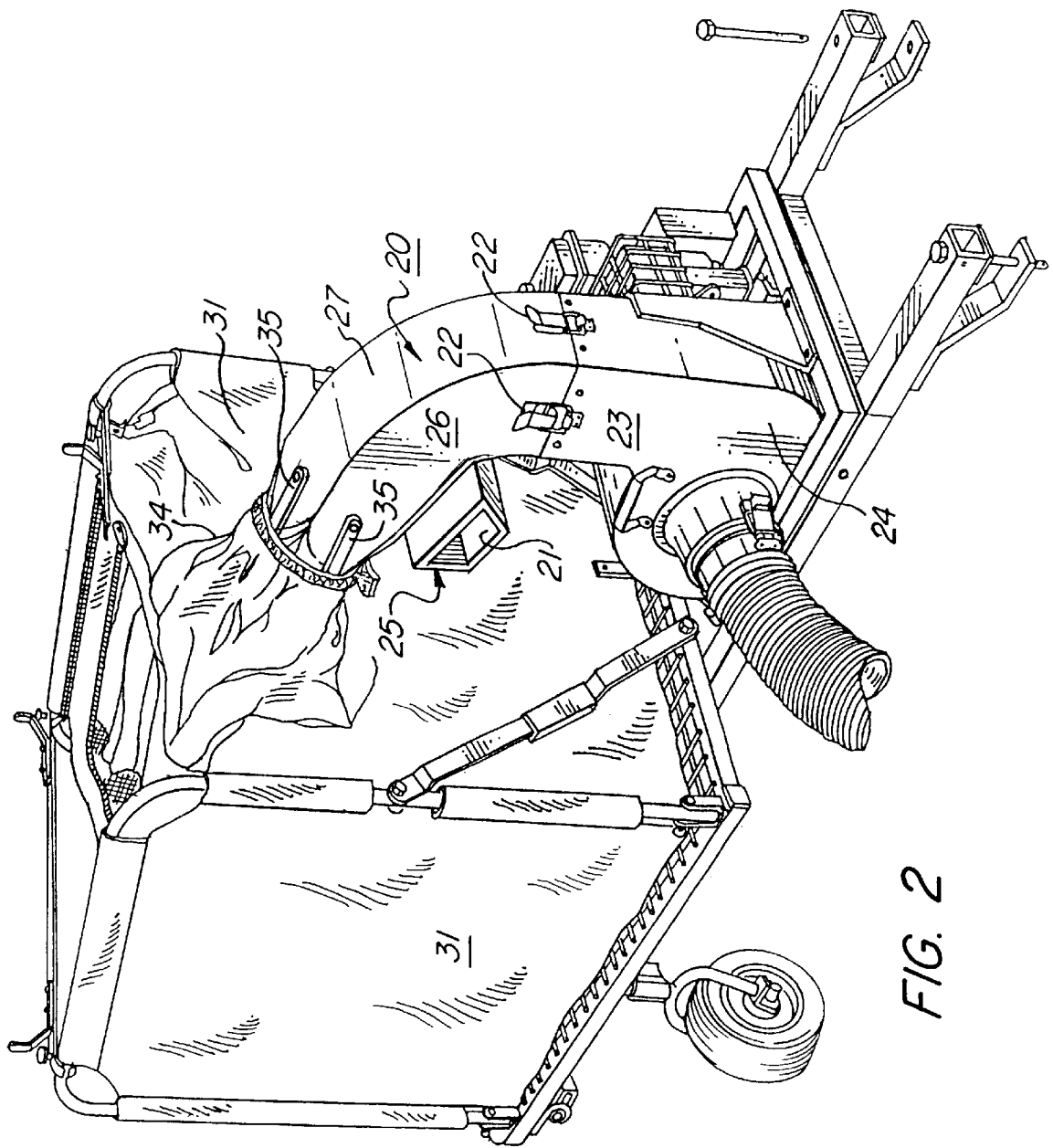
FIG. 2 is a perspective view of the trailer showing the blower, the exhaust conduit and the collector bag all carried on the trailer.
Figures 3, 4, 5:
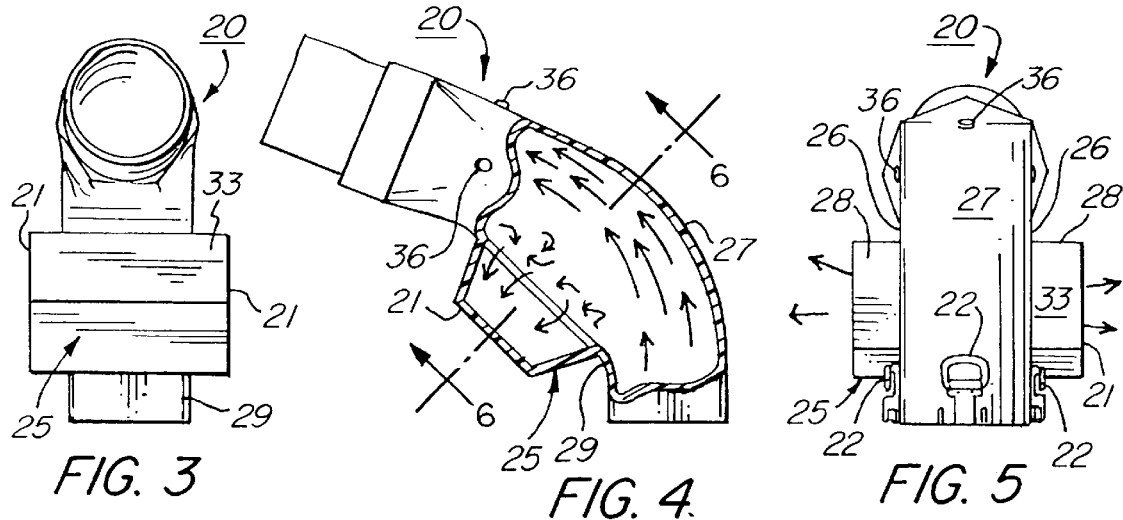
FIG. 3 is a rear elevation view of the exhaust conduit of FIG. 1, showing the dual exhaust vents formed in its underside.
FIG. 4 is a side elevation view, partially in cross section showing flow paths of the blower's exhaust air stream carrying entrained debris, and back-pressure eddies on the smaller radius inside portion of the exhaust conduit's curved sector.
FIG. 5 is a front elevation view of the exhaust conduit.

The sidewalls 26 of conduit 20 are substantially flat and parallel. The upper wall 27 is convexly curved as shown in the FIGURES, bending rearwardly from an entrance end to an exit end toward the collector bag 31 a sector angle of about 75°, and an intake shroud 34 is detachably secured by snap tabs 35 to snaps 36 mounted on the round upper exit end of curved conduit 20 (FIGS. 1, 2).

Figure 6:
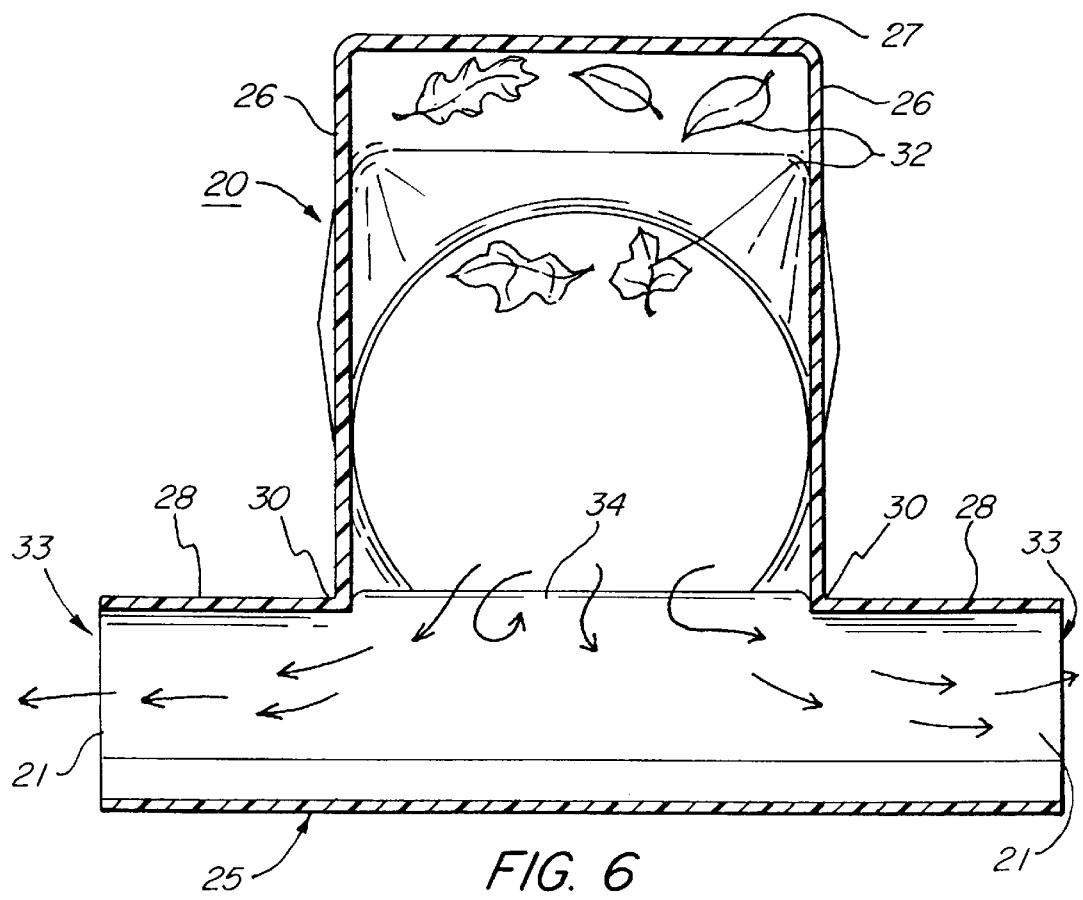
FIG. 6 is an enlarged cross-sectional rear oblique view of the exhaust conduit taken along the line 6—6 in FIG. 4, showing the interior of the conduit opening directly into the lateral exhaust vents.

As shown in the FIGURES, pressure relief vents 21 may be formed as a laterally extending vent tube 25, which may be of trapezoidal cross-section with its widest face 28 facing upward, integrally joined to the lowest portion of sidewalls 26 along a junction 30 (FIG. 6). Lower wall 29 of conduit 20 is spaced below upper wall 27, defining a curved interior passage of generally uniform cross-section, bounded by side walls 26, upper wall 27 and except in the region of relief vents 21 by lower wall 29.

As clearly shown in FIG. 6, the upper face 28 of vent tube 25 and the lower wall 29 of conduit 20 do not extend across conduit 20 between the two junctions 30. Instead the interior of conduit 20 opens without obstruction into the interior of relief vent tube 25 thereby forming an enlarged central opening 34 which occupies substantially the entire width of the conduit 20 in the region between the two junctions 30, Lateral ends 33 of the relief vent tube 25 form relief vents 21, open to the atmosphere. The vent tube 25 and the conduit 20 have separate non-overlapping cross-sections, wherein the radial cross-section through the vent tube 25 and the conduit 20 exhibits an inverted "T" shape.

At first glance, the casual observer might expect that the blower driven debris stream 32 from blower 24 would be diverted and expelled from both ends 33 of the relief vent tube 25, and would never reach collector bag 31.

It has been discovered, however, that only a negligible quantity of debris exits sidewise from the ends 33 of vent tube 25, while pressure in collector bag 31 is significantly reduced, and greater than expected volumes of leaves, grass clippings and similar organic debris are collected and effectively packed down in collector bag 31. It is believed that the debris-laden blower-driven air stream 32, traveling through the curved conduit 20 and represented by elongated arrows in FIG. 4 and by leaves shown in FIG. 6, is concentrated in the upper half of conduit 20 near upper arched wall 27 at the "outside" of the bend in the curved conduit 20, thus reducing the velocity of the air stream at the "inside" of the bend in curved conduit 20, near relief vents 21.

This is believed to be analogous to the flow characteristics at the bend in a river channel, where centrifugal force causes the fastest current and the highest flow rate in gallons per minute to occur at the outside of the bend, while stagnant flow and reverse eddies are observed at the inside of the bend. This sometimes produces shoaling of the river bed at the inside of the bend, causing deep-draft vessels to steer near the outside of the bend, to avoid grounding.

Stagnant flow and eddies near vents 21 on the "inside" of the bend in conduit 20 are believed to account for the reduced back-pressure found in collector bag 31, and for the insignificant amount of debris escaping from vents 21, on the "inside" of the bend in conduit 20.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A curved blower conduit vented for pressure relief, having an entrance end connectable to an outlet portal of a blower and an exit end connectable to an inlet portal of a cargo container, for carrying the blower's exhaust air stream to the cargo container, comprising in combination:

a curved sector conduit extending between and joining said entrance end and said exit end, attachment means mounted on said sector conduit near said ends for securing said connections, an outer peripheral portion of said sector conduit having a first radius of curvature, an inner peripheral portion of said sector conduit having a second radius of curvature substantially smaller than said first radius of curvature, and vent means connecting the interior of said sector conduit, at a point of said inner peripheral portion intermediate between said entrance end and said exit end, to the external atmosphere, whereby the blower's exhaust air stream is concentrated near the outer peripheral portion, relieving pressure in said cargo container by directing any return flow stream along the inner peripheral portion and out through said vent means.

2. The curved blower conduit defined in claim 1 wherein said vent means provides the sole connection between said cargo container and the atmosphere, said cargo container being otherwise a substantially sealed chamber.

3. The curved blower conduit defined in claim 1 wherein said vent means provides an additional connection between said cargo container and the atmosphere, supplementing an open-mesh screen incorporated in the cargo container itself.

4. The curved blower conduit defined in claim 1 wherein said cargo container is a flexible fabric bag.

5. The curved blower conduit defined in claim 1 wherein said cargo container is formed of rigid metal.

6. The curved blower conduit defined in claim 1 wherein said cargo container is formed of rigid plastic.

7. The curved blower conduit of claim 1 wherein said conduit is arched upwardly and said vent means comprises a laterally extending vent conduit anchored to the inner peripheral portion of the curved sector conduit and having open ends exposed laterally and an enlarged central opening connecting the vent conduit to the sector conduit in the region where the two conduits are anchored together.

8. The curved blower conduit of claim 7 wherein the enlarged central opening occupies substantially the entire width of the curved sector conduit in the region where the two conduits are anchored together.

9. The curved blower conduit of claim 7 wherein the vent conduit and the sector conduit have separate, non-overlapping cross-sections.

10. The curved blower conduit of claim 9 wherein a radial cross-section through the vent conduit and the sector conduit exhibits an inverted "T" shape.

11. The curved blower conduit of claim 1 wherein the cross-section of the curved sector conduit is substantially uniform over the majority of its length.

12. The curved blower conduit of claim 11, wherein the substantially uniform cross-section of the curved sector conduit is approximately a square cross-section over the majority of its length.

13. The curved blower conduit of claim 1 wherein the entrance end and the exit end of the curved sector conduit define a sector angle of about 75°.

* * * * *

UNITED STATES PATENT AND TRADEMARK OFFICE
CERTIFICATE OF CORRECTION

PATENT NO.    : 6,308,375 B1  
DATED         : October 30, 2001  
INVENTOR(S)   : James C. Whitney Page 1 of 1

It is certified that error appears in the above-identified patent and that said Letters Patent is hereby corrected as shown below:

Column 3,
Line 19, after "31", -- at -- should be inserted.

Signed and Sealed this

Twelfth Day of November, 2002

*Attest:*

*Attesting Officer*

JAMES E. ROGAN
*Director of the United States Patent and Trademark Office*